United States Patent
Johnson (10) Patent No.: US 8,904,175 B2
(45) Date of Patent: Dec. 2, 2014

(54) SYSTEM AND METHOD FOR SECURE DISTRIBUTION AND/OR STORAGE OF DATA FILES WITH LONG TERM FILE INTEGRITY VERIFICATION

(75) Inventor: Rodney Johnson, Corpus Christi, TX (US)

(73) Assignee: Rodney Johnson, Corpus Christi, TX (US)

( * ) Notice: Subject to any disclaimer, the term of this patent is extended or adjusted under 35 U.S.C. 154(b) by 193 days.

(21) Appl. No.: 13/475,685

(22) Filed: May 18, 2012

(65) Prior Publication Data
US 2012/0297191 A1    Nov. 22, 2012

Related U.S. Application Data

(60) Provisional application No. 61/488,052, filed on May 19, 2011.

(51) Int. Cl.
*H04L 9/00* (2006.01)
*H04L 9/32* (2006.01)
*H04L 29/06* (2006.01)

(52) U.S. Cl.
CPC ........... *H04L 9/3236* (2013.01); *H04L 63/0428* (2013.01); *H04L 63/123* (2013.01)
USPC ........................................................ 713/168

(58) Field of Classification Search
USPC ........................................................ 713/168
See application file for complete search history.

(56) References Cited

U.S. PATENT DOCUMENTS

2009/0063196 A1*   3/2009   Frederickson .................... 705/3
2010/0280924 A1*   11/2010   Wyngarden .................... 705/27

* cited by examiner

*Primary Examiner* — Tu Nguyen
(74) *Attorney, Agent, or Firm* — Klemchuk Kubasta LLP; Shannon W. Bates (57) ABSTRACT

Systems and methods for securely uploading, distributing, managing and/or storing any type of data file within a subscriber-based system maintained by a third party administrator are disclosed. The subscriber-based system acts as an electronic repository to ensure that data files remain intact, secure, and unaltered from their original form. Systems and methods for long term verification of data file integrity using checksum records stored in a public checksum directory are also disclosed.

20 Claims, 4 Drawing Sheets

SYSTEM AND METHOD FOR SECURE DISTRIBUTION AND/OR STORAGE OF DATA FILES WITH LONG TERM FILE INTEGRITY VERIFICATION

CROSS-REFERENCE TO RELATED APPLICATIONS

This application claims priority to U.S. Provisional Patent Application No. 61/488,052, entitled "SYSTEM AND METHOD FOR SECURE DISTRIBUTION AND/OR STORAGE OF DATA FILES WITH LONG TERM FILE INTEGRITY VERIFICATION" filed on May 19, 2011, which is incorporated by reference herein for all purposes.

TECHNICAL FIELD

The present disclosure relates generally to systems and methods for securely uploading and distributing data files within a subscriber-based system maintained by a third party administrator; for securely storing and managing such data files within the subscriber-based system as an electronic repository keeping the data files intact and unalterable, with no access to the content of the data files by the third party administrator; and for long term verification of data file integrity through the subscriber-based system, regardless of whether the data file is still stored on the subscriber-based system, and regardless of whether the third party administrator is still in business or the system otherwise exists.

BACKGROUND

Important business and personal data has conventionally been maintained in different formats, including paper files and electronic files. Traditional distribution methods for such data files, including regular mail, facsimile and electronic mail (e-mail), for example, may allow the data files to be accessed or retrieved by someone other than the intended recipient. Likewise, traditional storage systems, such as file rooms and electronic networks, for example, may allow the data files to be tampered with or altered from their original form. Traditional storage methods may also involve storing such data files in a variety of different formats and in different physical or electronic locations, which precludes efficient data aggregation, mining, searching and/or linking of such data files.

SUMMARY

Embodiments of the present disclosure generally provide systems and methods for securely uploading and distributing data files within a subscriber-based system maintained by a third party administrator.

Embodiments of the present disclosure also generally provide systems and methods for securely storing and managing data files within the subscriber-based system as an electronic repository to ensure the files remain intact, secure, and unalterable from their original form, with no access to the content of the data file by the third party administrator.

Embodiments of the present disclosure further generally provide systems and methods for long-term verification of data file integrity through the subscriber-based system, regardless of whether the data file is still stored on the subscriber-based system, and regardless of whether the third party administrator is still in business or the system otherwise exists.

In an embodiment, the present disclosure provides a subscriber-based system comprising a secure computer server and desktop software and/or enterprise software to manage data files and the content thereof. In various embodiments, such management may comprise, for example, data file transfers, deletions, encryption/decryption, synchronization, data aggregation, integrity verification, content analysis, structure control, sorting, querying, hyper linking and accounting.

In an embodiment, the subscriber-based system further comprises a public computer server with one or more open and publicly accessible directories, including a checksum records directory.

In an embodiment, the present disclosure provides a method for establishing an anonymous account with the subscriber-based system by setting a username, a password, and a system identification (ID) that may also be used as a public key for optional public key data encryption.

In another embodiment, the present disclosure provides a method for establishing an identity account with the subscriber-based system under a user's own name. The identity account may be established by presenting to a registered agent of the subscriber-based system sufficient forms of positive identification that may be linked to the username, password, and system ID associated with the subscriber's identity account.

In an embodiment, the present disclosure provides a method for an account holder of a subscriber-based system to upload a data file to the system. The account holder may further encrypt the data file before uploading. Once uploaded, the data file may be stored in the account holder's dedicated directory on the system, distributed to one or more other account holders' dedicated directories on the system, or downloaded from the system, all with no ability to alter its content.

In an embodiment, the method may further comprise associating tracking information with the data file, such as system ID numbers/public keys, a data description, a time stamp, and a date stamp, for example. Associating tracking information with the data file may be performed by a third party administrator that maintains the subscriber-based system rather than by an account holder on the system.

In an embodiment, the method may further comprise creating a checksum of an uploaded data file, associating the checksum with tracking information for the data file, and maintaining a checksum record comprising the checksum with the tracking information in a publicly accessible checksum directory on the system.

In various embodiments, the present disclosure provides systems and methods for one account holder of a subscriber-based system to distribute to another account holder of the subscriber-based system any type of data file, such as: purchase transaction records; financial statements; merchant discounts and offers; invoices; mail; government documents; voting ballots; medical records; insurance records; legal records; and music, books, movies and other digital media, for example. In an embodiment, account holders may control which of such distributed data files are received into their directories by allowing or blocking data file distribution based on the identity of the sending account holder or the type of data file.

In various embodiments, the present disclosure further provides systems and methods for an account holder of a subscriber-based system to store and manage any type of data file in the account holder's dedicated directory of the subscriber-based system.

The present disclosure further provides systems and methods for an account holder of the subscriber-based system to download any type of data file to the account holder's registered computer. Once downloaded, the data file may be deleted from the subscriber-based system. In an embodiment, a checksum record of the data file remains stored in the checksum directory on the system for long term verification of data file integrity, regardless of whether the data file is still stored on the subscriber-based system. In another embodiment, a copy of the checksum record of the data file is provided to a subscriber for long term verification of data file integrity, even if the third party administrator is out of business or the system otherwise ceases to exist.

In still another embodiment, the present disclosure provides systems and methods for completing secure financial transactions between parties, either anonymously or under a user's own name. Such secure financial transactions may comprise payments to merchants or other entities through the subscriber-based system, for example.

BRIEF DESCRIPTION OF THE DRAWINGS

For a more complete understanding of the present disclosure and its features, reference is now made to the following description, taken in conjunction with the accompanying drawings, in which.

DETAILED DESCRIPTION

The present disclosure relates generally to systems and methods for securely uploading and distributing data files within a subscriber-based system maintained by a third party administrator; for securely storing and managing such data files within the subscriber-based system as an electronic repository keeping the data files intact and unalterable, with no access to the content of the data files by the third party administrator; and for long term verification of data file integrity through the subscriber-based system, regardless of whether the data file is still stored on the subscriber-based system, and regardless of whether the third party administrator is still in business or the system otherwise exists. In some embodiments, keeping the data files intact and unalterable may include allowing read-only access to the data file, restricting the ability of users to alter the data file (e.g., through password protection), and/or through the use of a restricted file format (e.g., a noneditable pdf file).

Figure 1:
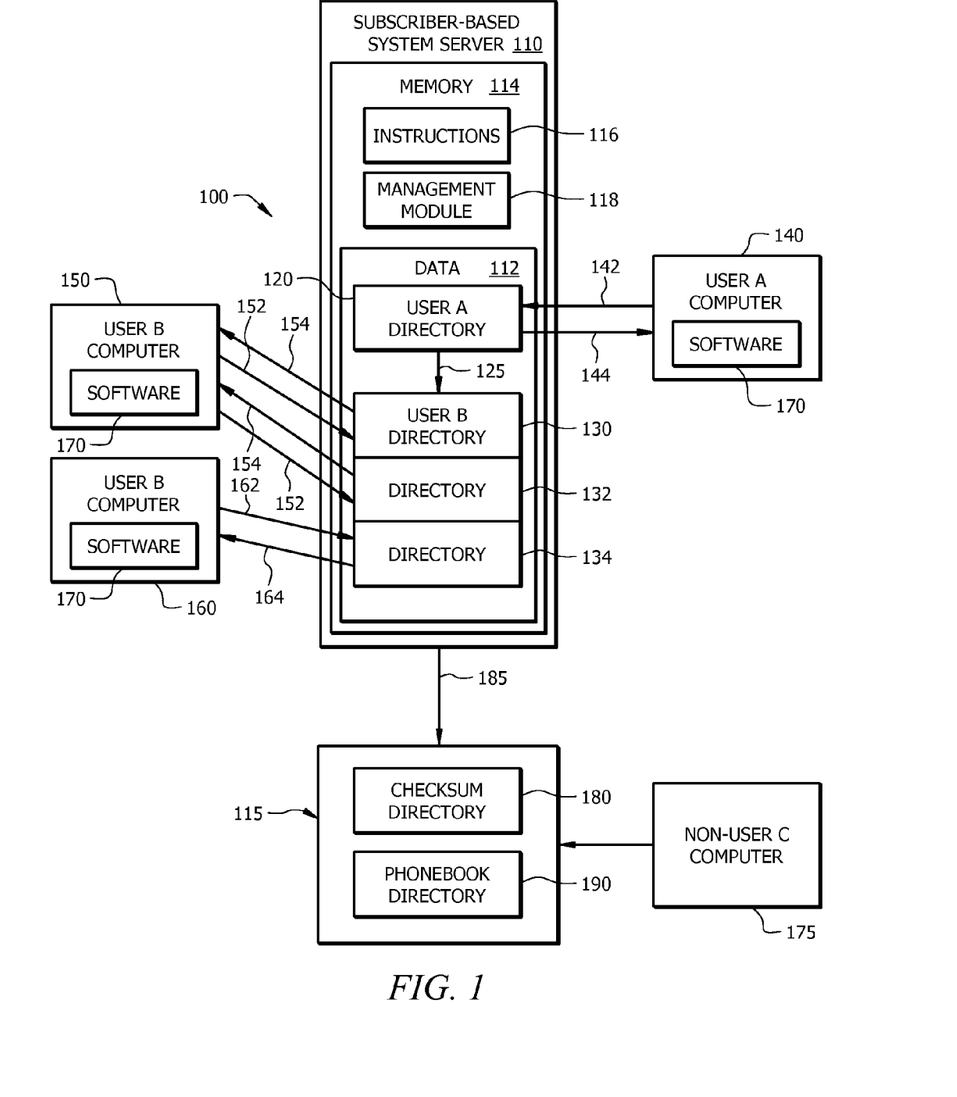
FIG. 1 is a schematic illustration of a subscriber-based system in accordance with one embodiment of the present disclosure.

FIG. 1 is a schematic illustration of a subscriber-based system 100 according to an embodiment of the present disclosure. It should be understood that the subscriber-based system 100 shown in FIG. 1 is for illustrative purposes only and that any other suitable system or subsystem could be used in conjunction with, or in lieu of, subscriber-based system 100 according to the present disclosure.

In an embodiment, subscriber-based system 100 may comprise a secure computer server 110 with multiple dedicated directories 120, 130, 132, 134 assigned to system subscribers, such as User A and User B, for example. In a representative example, User A may have a single dedicated directory 120 and User B may have multiple dedicated directories 130, 132, 134 on the server 110. In some embodiments, the data 112 such as the directories, 120, 130, 132, 134 may be stored on a memory 114 of the server 110. The memory 114 may also store instructions 116 such as an operating system and/or software modules executable by a processor of the server 110. The memory 114 may also store a management module 118.

The management module 118 may perform services for subscribers, such as facilitating the secure management of data; facilitating communications between users of the subscriber-based system, and/or receive information from users and non-users of the subscriber-based system. In some embodiments, the management module 118 may receive data files from users, restrict access to the data files, create data integrity records, create tracking information, associate other data with received and/or stored data files, and/or transmit data for storage in a memory of the server or other memories. In some embodiments, the management module 118 may transmit data such as the data file, the data integrity record, identity files, and other files to devices (e.g., computers, portable memory devices, and/or smartphones) of users and/or non-users. The management module 118 may transmit data such as the data file, the data integrity record, identity files, and other files to various memories for storage. The management module 118 may restrict access to the data file and/or restrict transmission of the data file. For example, the management module 118 may restrict transmission of the data file to another user based on preferences (e.g., sender identity, type of file, etc.). The preferences may be defined by the user receiving the data file and/or the user transmitting the file. The management module 118 may also instruct that data is removed from the memory 114 of the server 110 or other memories communicably coupled to the server 110.

The server 110 may also include a communication interface that allows the system 100 to communicate with other systems and/or memories. For example, the subscriber-based system 100 may retrieve data from a repository for analysis. The server may also include a presentation interface to present, for example, data integrity files and/or other information.

Subscriber-based system 100 may further comprise a public computer server 115 with multiple directories 180, 190 that are open and publicly available to non-subscribers to the system 100, such as Non-User C, for example. As an example, a repository may be accessible by users and non-users, who may view, download, and/or save files in the repository. In an embodiment, the public computer server 115 may comprise a checksum directory 180 for verification of the integrity of data files uploaded to the secure computer server 110, as described in more detail herein. In an embodiment, the public computer server 115 may further comprise an open phonebook directory 190, available for review by subscribers and non-subscribers alike, wherein User A and User B may optionally elect to post their names, addresses, phone numbers, email addresses, public encryption keys, and other information, for example. In an embodiment, the public computer server 115 may also be configured to enable non-subscribers to the system 100, such as Non-User C, to post their information to the open phonebook directory 190.

The subscriber-based system 100 may further comprise registered subscriber computers 140, 150, 160, each approved to connect to the secure computer server 110, and each associated with particular user directories 120, 130, 132, 134. In a representative example, User A computer 140 is associated with User A directory 120, User B computer 150 is associated with User B directories 130, 132, and User B computer 160 is associated with User B directory 134.

The subscriber-based system 100 may further comprise one or more non-subscriber computers 175, each approved to connect to the public computer server 115 to access the open and publicly available directories 180, 190 on the system 100. In a representative example, Non-User C computer 175 is operable to connect to public directories 180, 190 on the public computer server 115.

As used herein, the terms "server" and/or "computer" encompasses the broadest possible meaning of the term and includes, without limitation, a single personal computer (such as a desktop computer, laptop computer, notebook computer, tablet computer, hand-held computer, personal digital assistant (PDA), and smart phone, for example), a network of personal computers, a single enterprise computer, and a network of enterprise computers, etc.

In an embodiment, a connection between the registered subscriber computers 140, 150, 160 and the server 110 is accomplished through proprietary desktop and/or enterprise software 170. In particular, each of the registered subscriber computers 140, 150, 160 may be loaded with proprietary desktop and/or enterprise software 170 that may automatically synchronize with the secure computer server 110 whenever a subscriber is connected to the server 110 via the Internet.

As described in more detail herein, connection to the server 110 enables subscribers to upload and download data files to and from those directories 120, 130, 132, 134 that are associated with each of the registered computers 140, 150, 160. In FIG. 1, arrows 142, 152, 162 represent the operation of uploading data files and arrows 144, 154, 164 represent the operation of downloading data files. Uploaded data files may be encrypted at the subscriber computer 140, 150, 160 before being uploaded, and downloaded data files may be decrypted at the subscriber computer 140, 150, 160 after being downloaded.

Further, as described in more detail herein, when a data file is uploaded to the secure computer server 110, the system 100 may create a checksum for the data file, associate that checksum with tracking information for that data file to create a data integrity record such as a checksum record, and then transfer 185 the checksum record to public computer server 115 for long term storage in public checksum directory 180. Since the checksum directory 180 resides on the public computer server 115, both subscribers and non-subscribers to the system are permitted to access the public checksum directory 180 to verify data file integrity.

Although a data integrity test including a checksum has been described to verify the data file integrity, other data integrity tests may be created and/or utilized by the system. For example, data integrity tests may include checksum, cyclic redundancy checks, parity, and/or cryptographic hashes.

Uploaded data files may be addressed for distribution to another subscriber's directory. As a representative example, a data file uploaded 142 from User A computer 140 to User A directory 120 on the secure computer server 110 may be addressed for distribution by the system 100 to User B directory 130, as represented by arrow 125 in FIG. 1. In an embodiment, subscribers to the system can control which other users are permitted to distribute data files to the subscriber's directories and over which types of data files may be distributed to the subscriber's directories. In the present example, User B has not barred receipt of data files from User A nor the type of data file that User A is distributing to User B, so the data file distribution 125 from User A directory 120 to User B directory 130 is completed.

It is contemplated that the subscriber-based system 100 of FIG. 1 will be universal in that it will allow any individual or entity that meets the terms of use to subscribe to the system 100 and upload, store, distribute and/or download any type of data file to the secure computer server 110. The system 100 also provides a secure repository for data files since the third party administrators of the system 100 have no access to data content unless the data files are not encrypted. Further, the system 100 provides a public checksum directory 180 to enable long term verification of data file integrity, regardless of whether the data file has been deleted from the system, and regardless of whether the third party administrator remains in business and/or the system continue to exist, as described in more detail herein.

Figure 2:
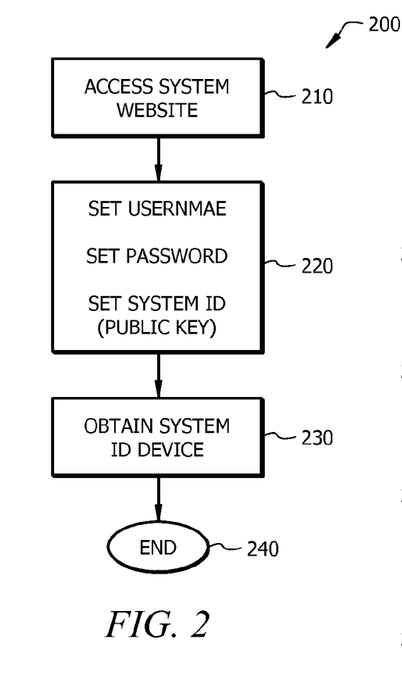
FIG. 2 is a flowchart of one embodiment of a method for establishing an anonymous account with the subscriber-based system of FIG. 1.

FIG. 2 depicts a flowchart of a method 200 for establishing an anonymous user account with the subscriber-based system 100 according to an embodiment of the present disclosure. In describing the method 200 of FIG. 2, reference may be made to FIG. 1 for clarity purposes. It should be understood that the method 200 reflected in FIG. 2 is for illustrative purposes only and that any other suitable method steps could be used in conjunction with, or in lieu of, the steps of method 200 according to the present disclosure.

The method 200 begins at step 210 when a user, such as User B, accesses a website associated with the subscriber-based system 100 using a computer that will be deemed a registered subscriber computer 150, 160 by the system 100 once the account is established.

At step 220, the user accesses an account set-up screen on the website where the user is prompted to type in a username, a password, and a system identification (ID), each of which may require certain characteristics, such as a specific length, numbers only, a combination of letters and numbers, any type of alphanumeric characters, etc. The user remains anonymous and is assured a level of privacy since no personal data is required during this step. Once the username, password, and system ID are set at step 220, the anonymous account is established and a directory 130, 132 or 134 is assigned to the account for User B.

In an embodiment, the subscriber's system ID may also act as a public key for encryption/decryption of data files. In more detail, the subscriber may use known public key encryption technology software to generate a matching public key and private key, or to associate a user-generated public key with a user-generated private key, for encrypting and decrypting data. Thus, in some embodiments, the subscriber may encrypt data files for distribution to other users while still maintaining anonymous status (e.g., personal data about the subscriber may not be distributed to other users of the system). For example, an anonymous user may upload a data file encrypted, using public key/private key technology based on the subscriber's system identification rather than personal data, to the system for purchase by and distribution to other anonymous subscribers and/or other subscribers. In some embodiments, an anonymous subscriber may distribute an encrypted data file to another anonymous subscriber and both parties may retain their anonymous status.

The subscriber retains his private key separate and apart from the system 100, but submits the public key to the system 100 as the subscriber's system ID. Other account holders in the system may then use the subscriber's system ID/public key to encrypt data files that are uploaded to the system for distribution to the subscriber, who can then download copies of the data files and use the private key known only to the subscriber to decrypt them. Other account holders in the system may also establish their own system IDs/public keys associated with individual private keys.

At step 230, the subscriber may obtain a system ID/public key device for use in transactions and data file transfers with other account holders in the system, such as individuals, merchants, businesses, and government entities, for example.

In an embodiment, the system ID/public key device comprises a bar code suitable for scanning that may be printed onto a sheet of paper or displayed on a hand-held computer, for example. In another embodiment, the system ID/public key device comprises a Radio-Frequency Identification (RFID) chip with the information encoded thereon. In another embodiment, a credit card number is set as a substitute for the system ID/public key, and the system ID/public key device is the credit card itself. When a credit card is used as the system ID/public key device, the party who accepts the credit card for a transaction will use the desktop and/or enterprise software 170 to look up the actual system ID/public key on the system server 110. Many other types of devices may be used for providing a system ID/public key to other account holders for adding to a transaction record or other data file. Once the subscriber obtains the system ID/public key device at step 230, the method 200 for establishing an anonymous user account ends at step 240.

An anonymous user account established via method 200 may be used for receiving, storing and managing many types of unalterable, data files. However, in some cases, subscribers may want/need to establish an account under their own name so that senders and recipients can verify the identity of the person or entity to whom or from whom data files are being distributed.

Figure 3:
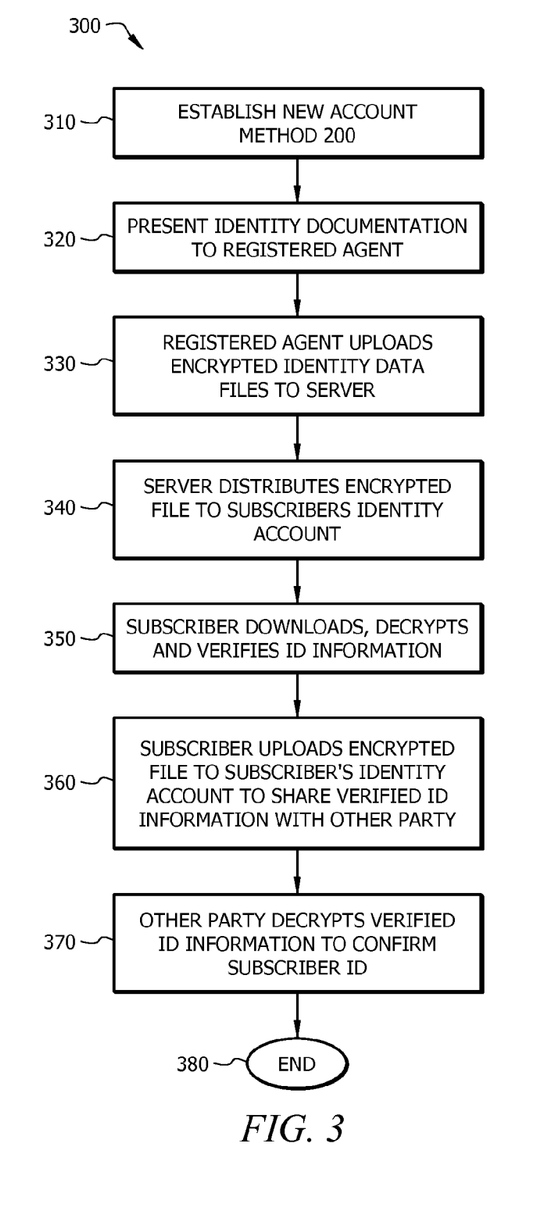
FIG. 3 is a flowchart of one embodiment of a method for establishing an identity account with the subscriber-based system of FIG. 1.

FIG. 3 depicts a flowchart of a method 300 for establishing an identity account with the subscriber-based system 100 under a user's own name according to an embodiment of the present disclosure. In describing the method 300 of FIG. 3, reference may be made to FIG. 1 for clarity purposes. It should be understood that the method 300 reflected in FIG. 3 is for illustrative purposes only and that any other suitable method steps could be used in conjunction with, or in lieu of, the steps of method 300 according to the present disclosure.

The method 300 begins at step 310 when a user, such as User B, establishes another subscriber account with the subscriber-based system 100 following the method 200 of FIG. 2. The account established in step 310 requires a new and unique system ID/public key from any anonymous accounts. In an embodiment, an identity account established according to method 300 is separate and distinct from any established anonymous accounts 130, 132, 134, and the system 100 has no record of any link between the identity account and such anonymous accounts 130, 132, 134.

In step 320, the subscriber may present to a registered agent of the system 100 the identity account information established in step 310 along with documentation verifying the identity of the subscriber. Such documentation may include, but is not limited to, a driver's license, a social security card, a birth certificate, and other legal documents that verify the legal name, mailing address, date and place of birth, and any other identity information that the subscriber would like to have certified on the system 100. The registered agent may record a physical address for mail through the postal service and an electronic address using existing protocols.

Each registered agent may be assigned a public key and a private key by the system 100, and administrators of the system 100 may maintain documentation of these assigned public/private keys. In step 330, the registered agent may create separate data files for specific identity elements based on the identity documents provided by the subscriber. Such separate data files may comprise identity elements such as name with Social Security number and/or name with address, for example. These separate identity data files are encrypted with the agent's private key, then encrypted with the subscriber's public key, then uploaded into the agent's designated directory on the server 110.

In step 340, the registered agent may authorize the secure computer server 110 to distribute the encrypted identity data files from the agent's designated directory to the designated directory associated with the subscriber's identity account. Security measures will ensure that the registered agent is the source of the transmitted data.

In step 350, the subscriber may download the encrypted identity data files, decrypt the data file with his own private key, decrypt the data file with the registered agent's public key, and verify the accuracy and completeness of the identity data. The subscriber will then notify the registered agent of any errors. Otherwise, the subscriber keeps a copy of identity data files, which are encrypted with the registered agent's private key.

In step 360, when the subscriber wants to share the verified identity data with another party, the subscriber may then upload the identity data files, encrypted with the other party's public key, to the subscriber's identity account directory for access by or distribution to the other party.

In step 370, the other party may access the subscriber's identity data files by decrypting the confirmation with the other party's private key, then with the registered agent's public key. Decrypting the identity data files with the registered agent's public key confirms to the other party that the identity data files were created and verified by the registered agent since such decryption would only be possible if the identity data files were encrypted by the registered agent's private key. The method 300 ends at step 380.

In an embodiment, the identity data files established via method 300 reside within the subscriber's identity account directory, encrypted with the registered agent's private key. Alternatively, the identity data files encrypted with the registered agent's private key may be maintained by the subscriber separate and apart from the system 100. The certified identity data file, as described, may preclude the need for traditional third party digital certificates.

Entity subscribers to the system 100 could benefit from establishing identity accounts for verifying the source and recipient of, and the integrity of, important business records in a single, secure server 110 where the documents cannot be deleted or altered. Such identity accounts could be used for sales people placing orders, accounts receivable and payable, employees submitting expense reports, human resources records, and any other data file that the business desires to maintain in an unaltered state. In an embodiment, the system 100 and the methods described herein may be used for legal compliance in the maintenance of records.

Figure 4:
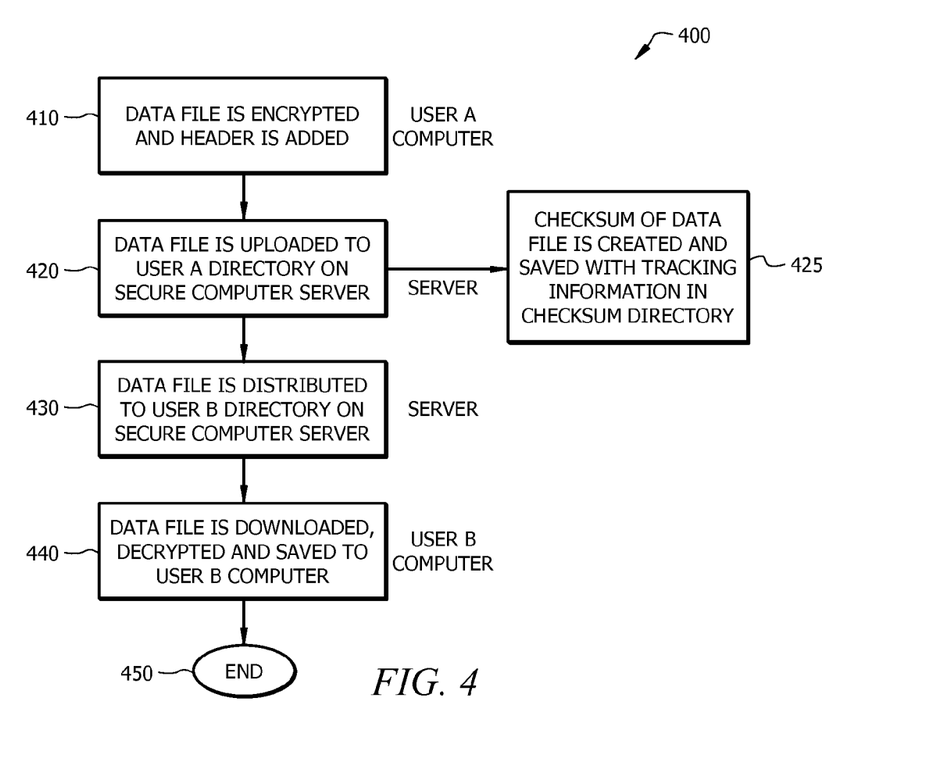
FIG. 4 is a flowchart of one embodiment of a method for uploading, distributing, storing and downloading a data file using the subscriber-based system of FIG. 1.

FIG. 4 is a flowchart of one simplified, representative embodiment of a method 400 for uploading, distributing, storing and downloading an encrypted, data file using the subscriber-based system 100 of FIG. 1 according to an embodiment of the present disclosure. In describing the method 400 of FIG. 4, reference may be made to FIG. 1 for clarity purposes. It should be understood that the method 400 reflected in FIG. 4 is for illustrative purposes only and that any other suitable method steps could be used in conjunction with, or in lieu of, the steps of method 400 according to the present disclosure. Users, in some embodiments, may be anonymous users and/or users with identity accounts.

Referring now to FIG. 1 and FIG. 4, the method 400 begins at step 410 where a subscriber of the system 100, such as User A, optionally encrypts a data file in preparation for uploading 142 the data file to the secure computer server 110 of the system 100. In an embodiment, User A encrypts the data file using a system ID/public key provided by User B during a transaction with User A. In another embodiment, User A encrypts the data file with a private key established by User A.

In an embodiment, the third party administrator of the system may optionally dictate data structure standards for certain data file types to enable data integration from multiple sources. In an embodiment, the data file may optionally be structured using XML or proprietary structure that allows the data to be categorized, indexed and searched. As one representative example, if the data file corresponds to a purchase made by individual User B from merchant User A, the data file may include a header that classifies the type of data contained therein as a receipt and may include such data fields as merchant name, purchase location, purchase date, item purchased, quantity purchased, and price, for example. The data file may further include the system ID/public key of User B as the intended recipient of the data file.

In step 420, the data file may be uploaded 142 from the User A registered subscriber computer 140 to the User A directory 120 on the secure computer server 110. Uploading an encrypted data file to the server 110 is similar to recording a document with a courthouse or other government entity. The data submitted is maintained by the system 100 and cannot be altered. Moreover, only a subscriber with a corresponding public or private key operable to decrypt the data file can access the data.

In step 425 of the method 400, the system 100 creates a checksum of the uploaded data file. A checksum is like a signature for the data file, and the checksum will change if the data file is altered in any respect. The system 100 also adds tracking information, such as sender identification, the checksum, a tracking number, and a time stamp to the header of the data file. A checksum record of the data file comprising the checksum and the tracking information for the data file is then saved to the public checksum directory 180 on the public computer server 115.

In the next step 430 of the method 400, the encrypted data file may be distributed 125 from the User A directory 120 to the appropriate User B directory 130, 132, 134 on the secure computer server 110 corresponding to the system ID/public key data that was identified in the data file. In some embodiments, User B may establish rules for determining whether or not the data file can be distributed 125 to the intended User B directory 130, 132, 134. In this embodiment, User B has the option of blocking certain types of data files or data files distributed by certain subscribers or types of subscribers to the system 100.

In a representative example, the rules established by User B allow data files originating with User A to be distributed 125 to any of the User B directories 130, 132, 134, and the rules also allow distribution 125 of the data file type that User A intends to distribute to User B. If the data represents a purchase by User B from User A, then the data file represents a certified copy of an unalterable receipt for that transaction so that User B is not required to track a paper receipt.

User A may also retain a copy of the data file on User A registered subscriber computer 140 or within its directory 120 on the secure computer server. By retaining copies of such data file receipts, merchant User A will have the ability to track the individual shopping habits of individual User B as well as communicate with User B, even without knowing the actual identity of User B. Thus, the present systems and methods enable two subscribers of the system to conduct transactions and communicate with one another while remaining anonymous.

In step 440 of the method 400, User B may download 154, 164 a copy of the data file from the User B directory 130, 132, 134 where the data file is stored. In various embodiments, User B may use a registered subscriber computer 150, 160 associated with the designated directory 130, 132, 134 to complete the download 154, 164 or User B may use an unregistered computer to complete the download 154, 164. User B may then decrypt the downloaded data file using the User B private key if User A encrypted the data file with the User B public key. Alternatively, User B may decrypt the downloaded data file using the User A public key if User A encrypted the data file with the User A private key. The decrypted data file may then be saved to a User B computer 150, 160 using the proprietary software 170. For financial transactions, the decrypted data file saved to the User B computer 150, 160 may be used to link the transaction to User B's detailed financial records, allowing for data queries and/or hyper linking to related documents. The method 400 ends at step 450.

In an embodiment, after the data file has been downloaded to the User B computer 150, 160, all uploaded copies of the data file may be deleted from the system 100 while still retaining the ability to verify data file integrity and file ownership in the future. In particular, because the system 100 comprises a unique public directory 180 of data file checksums, anyone to whom User B provides a copy of the data file can re-encrypt the data file with User B's public key and compare the checksum of the re-encrypted file with the checksum record held by the system 100 in public directory 180. If the checksums match, the data file has not been altered, and re-encrypting with User B's public key also confirms that User B was the original recipient of the data file from the system 100. Thus, the system 100 still performs the function of a repository that maintains records operable to prove the integrity of a data file.

In another embodiment, the systems and methods of the present disclosure enable long term verification of data file integrity, even if data stored on the system 100 is lost, and even if the third party administrator goes out of business and/or shuts down the system 100.

Figure 5:
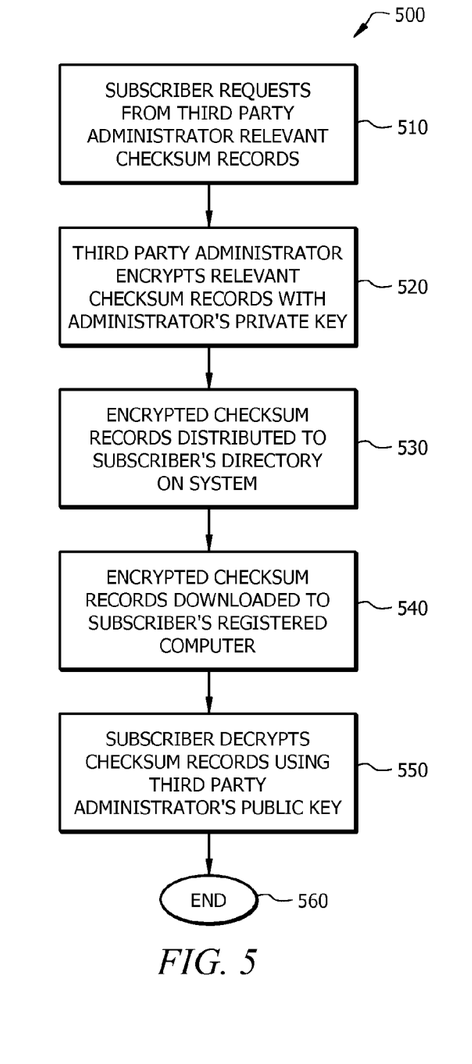
FIG. 5 is a flowchart of one embodiment of a method for long term verification of data file integrity using the subscriber-based system of FIG. 1.

FIG. 5 is a flowchart of one simplified, representative embodiment of such a method 500 for long term verification of data file integrity using the subscriber-based system 100 of FIG. 1. In describing the method 500 of FIG. 5, reference may be made to FIG. 1 for clarity purposes. It should be understood that the method 500 reflected in FIG. 5 is for illustrative purposes only and that any other suitable method steps could be used in conjunction with, or in lieu of, the steps of method 500 according to the present disclosure.

The method 500 begins at step 510 where a subscriber to the system, such as User A, requests from the third party administrator relevant checksum records from the public checksum directory 180.

In step 520 of the method 500, the third party administrator encrypts such relevant checksum records with the administrator's private key.

In step 530, the encrypted checksum records are distributed to the subscriber's directory, such as User A's directory 120, on the secure computer server 110, and in step 540, the encrypted checksum records are downloaded 144 to the subscriber's computer, such as User A computer 140.

In step 550, at any time the subscriber can then decrypt the checksum records using the third party administrator's public key to verify that the data files downloaded from the system 100 and stored on the subscriber's computer have not been altered. Thus, if the system 100 were to shut down or lose data, subscribers can still verify the integrity of the data files that had been uploaded to the system 100 before that date. The method 500 ends at step 560.

It is contemplated that the subscriber-based system 100 and the methods 200, 300, 400, 500 described herein may have many different applications. In an embodiment, subscribers to the system 100 may include all parties to a financial transaction, such as an individual, a merchant and a bank. In that case, the system 100 may enable individuals to pay merchants from a bank account at the point of sale.

Figure 6:
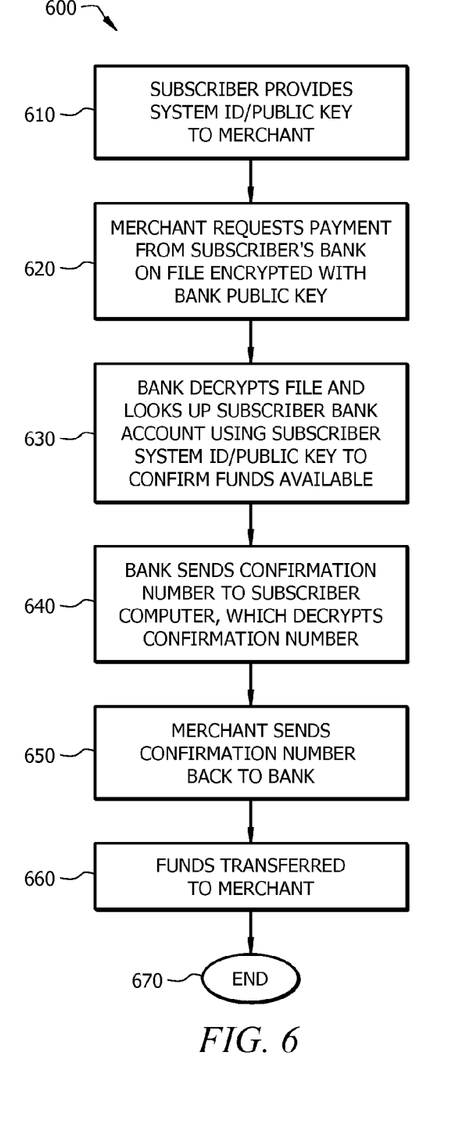
FIG. 6 is a flowchart of one embodiment of a method for making a payment through the subscriber-based system of FIG. 1.

FIG. 6 is a flowchart of one embodiment of a method 600 for making a payment from a bank account at a point of sale through the subscriber-based system 100 of FIG. 1 according to an embodiment of the present disclosure. In describing the method 600 of FIG. 6, reference may be made to FIG. 1 for clarity purposes. It should be understood that the method 600 reflected in FIG. 6 is for illustrative purposes only and that any other suitable method steps could be used in conjunction with, or in lieu of, the steps of method 600 according to the present disclosure.

The method begins at step 610 at the point of sale terminal where the individual subscriber provides the individual's system ID/public key and the bank's system ID/public key to the merchant. In an embodiment, the system IDs/public keys may be broadcast from the individual's hand-held computer, such as a PDA or smart phone. In another embodiment, the system IDs/public keys may be displayed on the PDA or smart phone as a bar code suitable for scanning by the merchant.

In the next step 620, the merchant sends a data file request for payment to the bank, encrypted with the bank's system ID/public key. In step 630, the bank decrypts the merchant's data file request for payment using the bank's private key. The bank then looks up the individual's bank account using the individual's system ID/public key to confirm that sufficient funds are present to cover the purchase.

In step 640, the bank may send a confirmation number to the individual's hand-held computer. In an embodiment, the confirmation number is encrypted with the individual's system ID/public key. The hand-held computer may then decrypt the confirmation number and display it as a bar code, or transmit it electronically to the merchant's computer.

In step 650, the merchant may send the confirmation number back to the bank, and in step 660 the bank may transfer the funds from the individual's bank account to the merchant's bank account. The method 600 ends at step 670.

The subscriber-based system 100 described herein offers long-term storage of data files that cannot be deleted or altered by any subscribers of the system 100. Moreover, administrators of the system 100 have no access to the content of encrypted data files. As such, these encrypted data files are ensured to remain intact in the original form received by the system 100.

The subscriber-based system 100 may allow any type of data file to be uploaded, stored, distributed and/or downloaded in accordance with the present disclosure. Such data files may include, but are not limited to: purchase transaction records; financial statements; merchant discounts and offers; invoices; mail; government documents; voting ballots; medical records; insurance records; legal records; and music, books, movies and other digital media, for example. Thus, the system 100 and methods 200, 300, 400, 500, 600 disclosed herein may support many different possible applications.

In an embodiment, one such application is a financial management and record-keeping tool. The system 100 may be operable to automatically aggregate and categorize data files identified as receipts, for example. The system 100 may also receive credit card statements and bank statements with hyperlinks to the individual receipts. The system 100 may further include hyperlinks between a warranty document, a user manual, and a receipt for the purchase of the item. In addition, the system 100 may interface with tax preparation software for preparation of tax returns.

Another application is a marketing tool for merchants. The system 100 may enable merchants to distribute coupons or special offers to the directories of individual subscribers based on their purchasing habits with that merchant, or based on their overall purchasing habits summarized in a system-generated profile, for example.

Additional applications include sending mail to subscriber's of the system 100 electronically rather than through the regular postal service; establishing a bidding system for purchasing items through the system 100; transferring medical records, insurance claim records, legal documents, government benefit transaction records (food stamps, unemployment, social security, student loans, etc.), voting registration forms, voting ballots, and other important documentation through the system 100; storing raw research data and notes to establish a verifiable timeline for development of the data; and many other possible applications. In some embodiments, a fee may be charged to a sending subscriber for distributing certain types of data files to receiving subscribers via the system 100. In other embodiments, data files may be sent COD to a subscriber's registered computer on the system 100.

It may be advantageous to set forth definitions of certain words and phrases used in this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

In some embodiments, the subscriber-based system and/or subscriber-based system server may be communicably coupled, for example through a network such as the Internet, to the user devices and/or the publically accessible repository. The subscriber-based system may automatically analyze the data files and determine a data integrity record such as the checksum record.

In some embodiments, the subscriber-based system may generate an interface to facilitate user interaction. The interface may be accessible through the Internet, for example.

Although the subscriber-based system has been described as including a server, the subscriber-based system may include other computing devices such as personal computers, laptops, etc.

Although data file has been described as the transmitted to the subscriber-based system by a user, various types and/or sizes of data may be transmitted and process as described. For example, XML data packets may be transmitted to the subscriber-based system and processed.

Although users have been described as a human, a user may be a person, a group of people, a person or persons interacting with one or more computers, and/or a computer system. Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackpad) by which the user can provide input to the computer. Other kinds of devices can be used to provide for interaction with a user as well; for example, feedback provided to the user by an output device can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

While the present disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A computer-implemented method for securely managing data, the method comprising:
   receiving encrypted data, wherein the encrypted data is associated with a first user, and wherein the first user is a subscriber of a subscriber-based system, and wherein the subscriber-based system is maintained by a third-party administrator;
   storing the encrypted data in a memory of the subscriber-based system, wherein the stored encrypted data is unalterable;
   restricting access to the stored encrypted data;
   creating a data integrity record associated with the encrypted data, wherein an integrity of the encrypted data is determined at least partially based on the created data integrity record; and
   transmitting the data integrity record to an accessible repository, wherein the accessible repository is accessible by devices associated with subscribers of the subscriber-based system and devices associated with non-subscribers of the subscriber-based system.

2. The method of claim 1 further comprising storing the data integrity record in at least one of the device associated with the first user or the accessible repository.

3. The method of claim 1 further comprising storing the encrypted data in a directory associated with the first user.

4. The method of claim 1 further comprising transmitting the encrypted data to one or more other users, wherein the one or more other users are subscribers of the subscriber-based system.

5. The method of claim 1 further comprising:
   retrieving the data integrity record of the encrypted data; and
   determining an integrity of the decrypted data based on the retrieved data integrity.

6. The method of claim 1 further comprising creating an identity account associated with the first user, wherein a validity of an identity of the first user is based at least partially on the identity account.

7. The method of claim 6 further comprising:
   transmitting the identity account associated with the first user to a second user, wherein the second user is a subscriber to the subscriber-based system; and
   decrypting the identity account at least partially based on a public key associated with a registered agent.

8. The method of claim 1 wherein the data integrity record includes tracking information and at least one checksum based at least partially on the encrypted data.

9. The method of claim 1 further comprising:
   transmitting the encrypted data to at least one of the first user or a second user, wherein the second user is a subscriber of the subscriber-based system; and
   removing the transmitted encrypted data from the memory of the subscriber-based system, wherein the data integrity record associated with the encrypted data is stored in at least one of the device associated with the first user, a device associated with the second user, or the accessible repository.

10. The method of claim 1 further comprising:
    allowing one or more other users to access the data integrity record associated with the encrypted data, wherein at least one of the other users comprises at least one of a subscriber of the subscriber-based system, an anonymous user, or not a subscriber of the subscriber-based system; and wherein the data integrity record may be used to verify the integrity of the encrypted data received by one or more of the other users from at least one of the subscriber-based system or received from a party other than the subscriber-based system.

11. The method of claim 1 further comprising decrypting the encrypted data using a private key associated with the first user, wherein the decrypted data is unalterable.

12. An article comprising non-transitory, machine-readable medium storing instructions for managing data, the instructions operable to cause data processing apparatus to perform operations comprising:
- receiving encrypted data, wherein the encrypted data is associated with a first user, and wherein the first user is a subscriber of a subscriber-based system, and wherein the subscriber-based system is maintained by a third-party administrator;
- transmitting the encrypted data for storage in a memory of the subscriber-based system, wherein the stored encrypted data is unalterable;
- restricting access to the stored encrypted data;
- creating a data integrity record associated with the encrypted data, wherein an integrity of the encrypted data is determined at least partially based on the created data integrity record; and
- transmitting the data integrity record to an accessible repository, wherein the accessible repository is accessible by devices associated with subscribers of the subscriber-based system and devices associated with nonsubscribers of the subscriber-based system.

13. The article of claim 12 wherein the instructions are further operable to cause data processing apparatus to perform operations comprising transmitting the encrypted data to a group of users, wherein the users of the group are subscribers of the subscriber-based system.

14. The article of claim 13 wherein the instructions are further operable to cause data processing apparatus to perform operations comprising allowing verification of an identity of at least one of the user or at least one user of the group of users based at least partially on an identity record.

15. The article of claim 13 wherein the first user is anonymous, and wherein at least one of the users in the group of users is anonymous, and wherein transmitting the encrypted data retains an anonymous status of the first user and an anonymous status of the at least one anonymous user of the group of users.

16. A system for securely managing data comprising:
- a subscriber-based system comprising:
  - a memory including encrypted data associated with a first user, wherein the encrypted data is unalterable, and wherein the first user is a subscriber of the subscriber-based system; and
  - a management module adapted to:
    - receive the encrypted data;
    - restrict access to the encrypted data; and
    - create a data integrity record associated with the encrypted data, wherein an integrity of the encrypted data is determined at least partially based on the created data integrity record; and
- wherein the subscriber-based system is managed by a third-party.

17. The system of claim 16, wherein the management module is further adapted to transmit the data integrity record to at least one of a device of the first user or an accessible repository, wherein the accessible repository is accessible by devices associated with subscribers of the subscriber-based system and devices associated with nonsubscribers of the subscriber-based system.

18. The system of claim 16 further comprising a repository including the data integrity record, wherein the repository is accessible by devices associated with subscribers of the subscriber-based system and devices associated with nonsubscribers of the subscriber-based system.

19. The system of claim 16 wherein the management module is further adapted to transmit the encrypted data.

20. The system of claim 16 wherein the management module is further adapted to remove the encrypted data from the memory when the encrypted data is transmitted.

\* \* \* \* \*